US007620610B2

(12) United States Patent
Macbeth et al.

(10) Patent No.: US 7,620,610 B2
(45) Date of Patent: Nov. 17, 2009

(54) RESOURCE AVAILABILITY FOR USER ACTIVITIES ACROSS DEVICES

(75) Inventors: Steven W. Macbeth, Snohomish, WA (US); Roland L. Fernandez, Woodinville, WA (US); Brian R. Meyers, Issaquah, WA (US); Desney S. Tan, Pittsburgh, PA (US); George G. Robertson, Seattle, WA (US); Nuria M. Oliver, Seattle, WA (US); Oscar E. Murillo, Seattle, WA (US); Mary P. Czerwinski, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 11/426,839

(22) Filed: Jun. 27, 2006

(65) Prior Publication Data

US 2007/0299796 A1    Dec. 27, 2007

(51) Int. Cl.
*G06F 15/18* (2006.01)

(52) U.S. Cl. ........................................................ 706/14

(58) Field of Classification Search .................. 706/12, 706/14, 16, 20, 21, 45, 903, 906, 926; 715/700, 715/701, 733, 734, 737, 738, 741, 745, 965; 705/1, 8, 9, 11; 709/203, 209, 219, 227, 709/248
See application file for complete search history.

(56) References Cited

U.S. PATENT DOCUMENTS

| | | | | |
|---|---|---|---|---|
| 5,737,728 | A * | 4/1998 | Sisley et al. .................. | 705/8 |
| 6,112,243 | A * | 8/2000 | Downs et al. ................ | 709/226 |
| 6,513,031 | B1 | 1/2003 | Fries et al. | |
| 6,571,215 | B1 * | 5/2003 | Mahapatro .................... | 705/8 |
| 6,727,914 | B1 | 4/2004 | Gutta | |
| 6,799,208 | B1 * | 9/2004 | Sankaranarayan et al. .. | 709/223 |
| 7,020,652 | B2 | 3/2006 | Matz et al. | |
| 7,058,947 | B1 * | 6/2006 | Raja et al. ................... | 718/104 |
| 7,062,510 | B1 | 6/2006 | Eldering | |
| 7,194,685 | B2 | 3/2007 | Morrison | |
| 7,363,282 | B2 | 4/2008 | Karnawat et al. | |
| 2003/0046401 | A1 | 3/2003 | Abbott et al. | |
| 2003/0130979 | A1 | 7/2003 | Matz et al. | |
| 2003/0135384 | A1 | 7/2003 | Nguyen | |
| 2004/0261026 | A1 | 12/2004 | Corson | |
| 2005/0080625 | A1 | 4/2005 | Bennett et al. | |
| 2005/0086046 | A1 | 4/2005 | Bennett | |

(Continued)

OTHER PUBLICATIONS

Bardram. "Activity-Based Computing—Lessons Learned and Open Issues" (Apr. 20, 2004) 1st International Workshop on Computer Support for Human Tasks and Activities, 5 pages.

*Primary Examiner*—David R Vincent
*Assistant Examiner*—Omar F Fernandez Rivas
(74) *Attorney, Agent, or Firm*—Shook, Hardy & Bacon L.L.P.

(57) ABSTRACT

A system that can integrate activities across machines and/or devices is disclosed. The innovation can be used in an "asynchronous" manner that enables a user to move or direct a set of activities and/or tasks within an activity from one device to another. Further, the system can facilitate adapting user interface factors with respect to a particular device such that a user can "synchronously" utilize all devices for the given activities and/or tasks. In other words, the "synchronous" scenario enables a user to share activity information between devices when simultaneously utilizing multiple devices in accordance with a particular activity.

20 Claims, 11 Drawing Sheets

U.S. PATENT DOCUMENTS

| | | |
|---|---|---|
| 2005/0091098 A1* | 4/2005 | Brodersen et al. ............... 705/8 |
| 2005/0097559 A1* | 5/2005 | He ............................ 718/104 |
| 2005/0144004 A1 | 6/2005 | Bennett et al. |
| 2006/0004680 A1 | 1/2006 | Robarts et al. |
| 2006/0010206 A1 | 1/2006 | Apacible et al. |
| 2006/0015387 A1 | 1/2006 | Moore et al. |
| 2006/0015479 A1 | 1/2006 | Wood et al. |
| 2006/0048059 A1 | 3/2006 | Etkin |
| 2006/0106497 A1 | 5/2006 | Ishikawa et al. |
| 2006/0107219 A1* | 5/2006 | Ahya et al. .................. 715/745 |
| 2006/0241997 A1 | 10/2006 | Bhatawdekar et al. |
| 2007/0067199 A1* | 3/2007 | Shine et al. ..................... 709/9 |
| 2007/0106497 A1 | 5/2007 | Ramsey et al. |
| 2007/0118804 A1 | 5/2007 | Raciborski et al. |
| 2007/0191979 A1* | 8/2007 | Zeng et al. .................... 700/97 |
| 2007/0219798 A1 | 9/2007 | Wang et al. |

* cited by examiner

RESOURCE AVAILABILITY FOR USER ACTIVITIES ACROSS DEVICES

CROSS REFERENCE TO RELATED APPLICATION(S)

This application is related to U.S. Ser. No. 11/426,846 filed on Jun. 27, 2006, entitled "LOGGING USER ACTIONS WITHIN ACTIVITY CONTEXT"; Ser. No. 11/426,832 filed on Jun. 27, 2006, entitled "CAPTURE OF PROCESS KNOWLEDGE FOR USER ACTIVITIES"; Ser. No. 11/426,830 filed on Jun. 27, 2006, entitled "PROVIDING USER INFORMATION TO INTROSPECTION"; Ser. No. 11/426,818 filed on Jun. 27, 2006 and entitled "MONITORING GROUP ACTIVITIES"; Ser. No. 11/426,810 filed on Jun. 27, 2006, entitled "MANAGING ACTIVITY-CENTRIC ENVIRONMENTS VIA USER PROFILES"; Ser. No. 11/426,827 filed on Jun. 27, 2006, entitled "CREATING AND MANAGING ACTIVITY-CENTRIC WORKFLOW"; Ser. No. 11/426,804 filed on Jun. 27, 2006, entitled "ACTIVITY-CENTRIC ADAPTIVE USER INTERFACE"; 11/426,796 filed on Jun. 27, 2006, entitled "ACTIVITY-CENTRIC DOMAIN SCOPING"; and Ser. No. 11/426,788 filed on Jun. 27, 2006, entitled "ACTIVITY-CENTRIC GRANULAR APPLICATION FUNCTIONALITY". The entirety of each of the above applications is incorporated herein by reference.

BACKGROUND

Conventionally, communications between humans and machines has not been natural. Human-human communication typically involves spoken language combined with hand and facial gestures or expressions, and with the humans understanding the context of the communication. Human-machine communication is typically much more constrained, with devices like keyboards and mice for input, and symbolic or iconic images on a display for output, and with the machine understanding very little of the context. For example, although communication mechanisms (e.g., speech recognition systems) continue to develop, these systems do not automatically adapt to the activity of a user. As well, traditional systems do not consider contextual factors (e.g., user state, application state, environment conditions) to improve communications and interactivity between humans and machines.

Activity-centric concepts are generally directed to ways to make interaction with computers more natural (by providing some additional context for the communication). Traditionally, computer interaction centers around one of three pivots, 1) document-centric, 2) application-centric, and 3) device-centric. However, most conventional systems cannot operate upon more than one pivot simultaneously, and those that can do not provide much assistance managing the pivots. Hence, users are burdened with the tedious task of managing every little aspect of their tasks/activities.

A document-centric system refers to a system where a user first locates and opens a desired data file before being able to work with it. Similarly, conventional application-centric systems refer to first locating a desired application, then opening and/or creating a file or document using the desired application. Finally, a device-centric system refers to first choosing a device for a specific activity and then finding the desired application and/or document and subsequently working with the application and/or document with the chosen device.

Accordingly, since the traditional computer currently has little or no notion of activity built in to it, users are provided little direct support for translating the "real world" activity they are trying to use the computer to accomplish and the steps, resources and applications necessary on the computer to accomplish the "real world" activity. Thus, users traditionally have to assemble "activities" manually using the existing pieces (e.g., across documents, applications, and devices). As well, once users manually assemble these pieces into activities, they need to manage this list mentally, as there is little or no support for managing this on current systems.

All in all, the activity-centric concept is based upon the notion that users are leveraging a computer to complete some real world activity. Historically, a user has had to outline and prioritize the steps or actions necessary to complete a particular activity mentally before starting to work on that activity on the computer. Conventional systems do not provide for systems that enable the identification and decomposition of actions necessary to complete an activity. In other words, there is currently no integrated mechanism available that can dynamically understand what activity is taking place as well as what steps or actions are necessary to complete the activity.

Most often, the conventional computer system has used the desktop metaphor, where there was only one desktop. Moreover, these systems stored documents in a single filing cabinet. As the complexity of activities rises, and as the similarity of the activities diverges, this structure does not offer user-friendly access to necessary resources for a particular activity.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can integrate activities across machines and/or devices. In one aspect, the innovation provides for the ability of a user to move or direct a set of activities and/or tasks within an activity from one device to another. The aforementioned scenario is referred to as "asynchronous" use of devices or "activity roaming."

In another aspect, the innovation can seamlessly spread activities across a number of user's devices. Further, the system can facilitate adapting user interface (UI) factors with respect to the particular device such that the user can "synchronously" utilize all devices for the given activities and/or tasks. In other words, the "synchronous" scenario enables a user to share activity information between devices. In aspects, it is possible for a user to simultaneously utilize multiple devices in accordance with a particular activity.

In one example of "asynchronous activity roaming", when a user goes home, oftentimes it is particularly useful to reproduce an activity state previously held on an office machine. In doing so, history, resources, fonts, data, etc. can be replicated taking into consideration capabilities and/or limitations of the target machine (e.g., home machine). This transition can be facilitated by pre-caching and/or dynamically updating (e.g., synchronizing) all devices belonging to a particular owner (or group). Thus, when an owner migrates to the next device, the necessary application and the data are already there in order to continue with the activity.

In other aspects, the system can suggest a device based upon a current or inferred future activity. As well, the system can suggest a device migration (e.g., cell phone to desktop computer) based upon a state within a particular activity.

In accordance with the novel functionality of the innovation, both "asynchronous" and "synchronous" scenarios can use context information to determine migration from one device or set of devices to another device or set of devices. This context information can include user capabilities, device capabilities, environmental factors, resources available, etc. For example, display real estate changes if migration is from a desktop computer equipped with a large monitor to a small handheld device, accordingly, UI aspects can adjust automatically. In other words, changes can be made to the UI dynamically to maintain the user experience taking into account the needs of the activity as well as limitations and capabilities of each device. In another aspect, the system can facilitate triaging multiple devices based upon the activity, suggesting the best device to move to or add in order to continue the current activity in a given context.

In yet another aspect thereof, a machine learning and reasoning (MLR) and/or an artificial intelligence component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
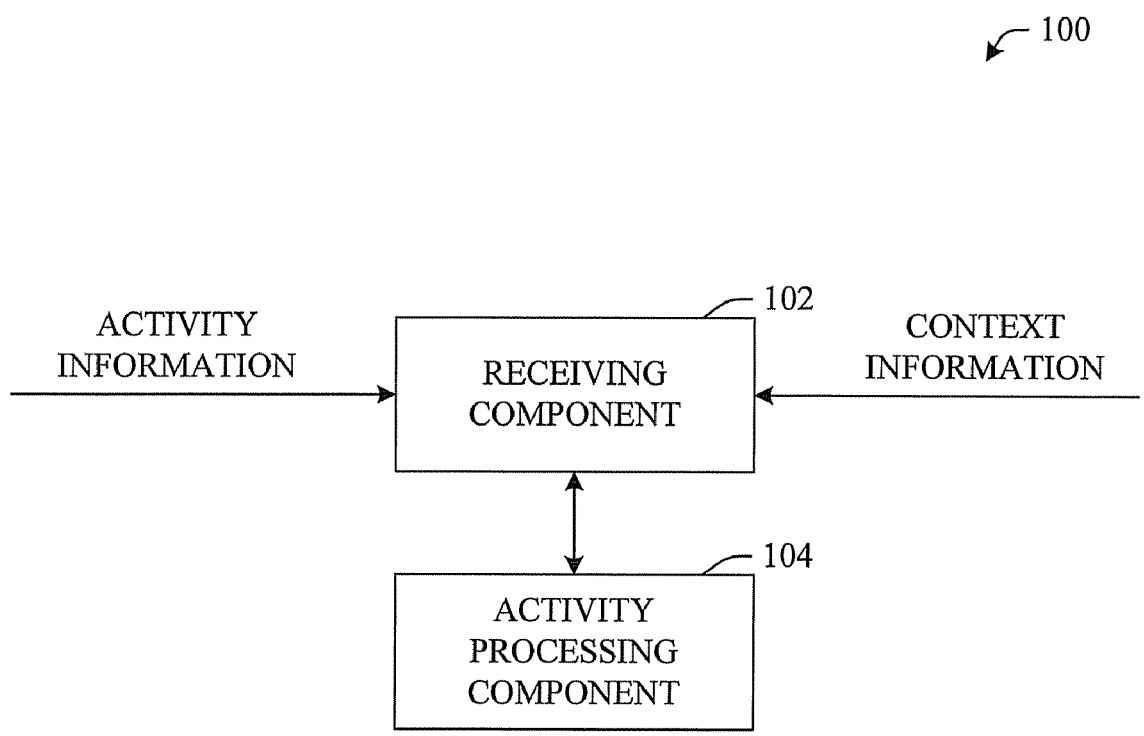
FIG. 1 illustrates a system that facilitates enabling activities to cross machines in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates a system 100 that facilitates activity-centric computing in accordance with an aspect of the innovation. Generally, system 100 can include a receiving component 102 and an activity processing component 104. In operation, the receiving component 102 can access information related to an activity (or group of activities). This activity information can be analyzed by the activity processing component 104 which can determine an appropriate device (or group of devices) that can be used in accordance with the detected (or inferred) activity. In other words, the system 100 can automatically select or suggest an appropriate device(s) with respect to a task, or group of tasks, associated with an activity.

Additionally, in an aspect, the receiving component 102 can access activity-centric context information which can also be analyzed by the activity processing component 104 in order to determine the appropriate device (or group of devices). Effectively, the novel innovation described herein can provide for a system 100 that can integrate activities across machines and/or devices.

Effectively, the activity processing component 104 can effectuate moving an activity or set of activities and/or tasks within an activity from one machine to another. It will be understood that this act of moving activities (or tasks) from one machine to another can be described as an "asynchronous" use of devices within an activity roaming environment. In another aspect, the innovation, via the activity processing component 104, can seamlessly spread activities across a set of user's devices while adapting user interface (UI) factors with respect to the particular device such that the user can "synchronously" utilize all devices for the given activities and/or tasks.

In one example of "asynchronous" activity roaming, when a user goes home, oftentimes it would be particularly useful to reproduce an activity state previously held on an office machine. In doing so, history, resources, fonts, data, etc. can be replicated taking into consideration capabilities and/or limitations of the target machine (e.g., home machine). In one aspect, this transition can be facilitated by pre-caching all devices belonging to a particular owner (or group). Thus, when an owner migrates to the next device, the necessary application and the data are already there in order to continue with the activity. In other aspects, the activity processing component 104 can suggest a device based upon a current or inferred future activity. As well, the activity processing component 104 can suggest a device migration (e.g., cell phone) based upon a state within a particular activity.

As stated above, in accordance with the novel functionality of the innovation, both in "asynchronous" and "synchronous" use cases, the activity information can be migrated from one device or set of devices to another device or set of devices, taking into consideration the activity context, user context, device context, environment context, and resources available. For example, display real estate changes if migration is from a desktop computer equipped with a large monitor to a small handheld device. Accordingly, UI characteristics and settings can adjust automatically to conform with capabilities of a target device. In other words, changes can be made dynamically to maintain the user experience taking into account the requirements of the activity as well as limitations and capabilities of each device. Further, the system 100 can facilitate triaging multiple devices based upon the determined (or inferred) activity, suggesting a device to move to or add in order to continue the current activity in a given context. Each of these novel aspects of the innovation will be described in greater detail with reference to the figures that follow.

Figure 2:
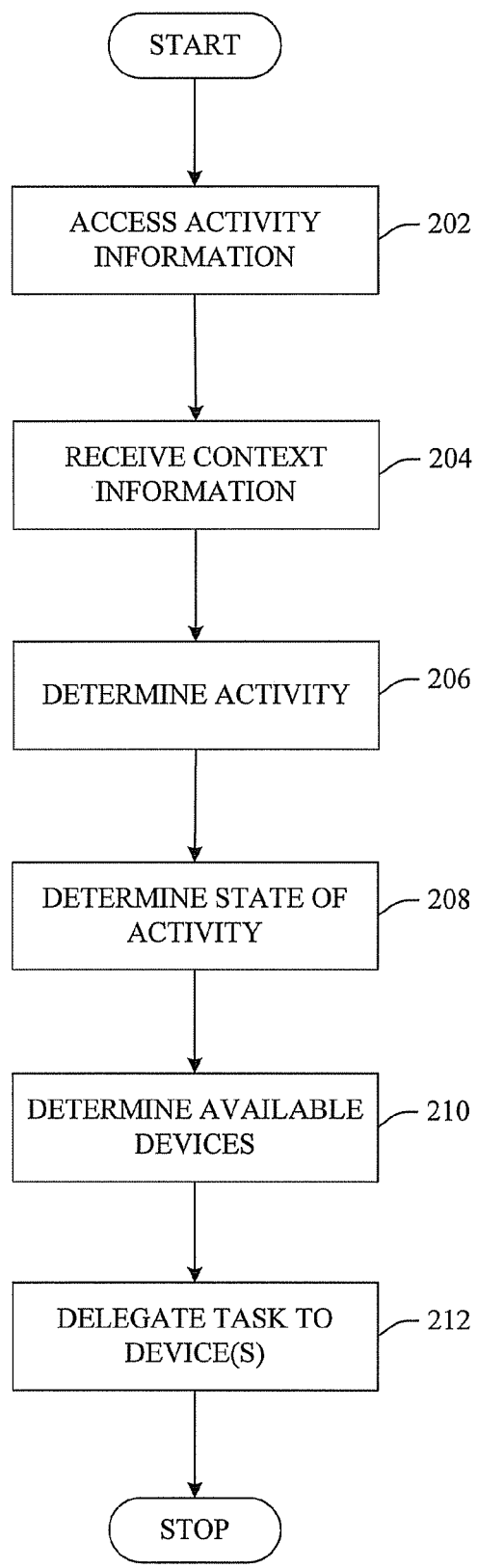
FIG. 2 illustrates an exemplary flow chart of procedures that facilitate delegating a task in accordance with an aspect of the innovation.

Turning now to FIG. 2, there is illustrated a methodology of delegating a task to a device, or group of devices, in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

With reference to FIG. 2, activity information is received or accessed at 202. For instance, this activity information can include an action or set of actions taken by a user. In one aspect, a monitoring component can be employed to record actions of a user. In another aspect, the activity information can be obtained from an activity log or other activity storage device.

At 204, activity-centric context information can be gathered to assist in determining a state within an activity and subsequently delegating a task to a device. As will be understood upon a review of the figures that follow, the context information can be any information related to a user, group of users (e.g., user state, knowledge, mood, location, calendar, contacts), a device (e.g., limitations, capabilities, availability), the environment (e.g., in a meeting, location), etc.

A relevant activity can be determined at 206 by analyzing and evaluating the activity information (e.g., actions) accessed at 202. As well, at 206, the context information can be considered to further assist in determining a state of a particular activity of a user. In one example, the state can be determined by inferring an activity or group of activities based upon machine learning and/or reasoning (MLR) techniques. These MLR techniques can be based upon any historical or statistical method known in the art. Those skilled in the art will understand and appreciate suitable MLR mechanisms to infer the state of the activity of a user (or group of users).

In one example, the innovation can employ an artificial intelligence (AI) or MLR component which facilitates automating one or more features in accordance with the subject innovation. The subject innovation (e.g., in connection with determining a current (or future) activity) can employ various AI-based schemes for carrying out various aspects thereof. For example, a process for determining what the state of the activity a user is engaging in or preparing to engage in can be facilitated via an automatic classifier system and process.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic, statistical and/or decision theoretic-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. By defining and applying a kernel function to the input data, the SVM can learn a non-linear hypersurface. Other directed and undirected model classification approaches include, e.g., decision trees, neural networks, fuzzy logic models, naive Bayes, Bayesian networks and other probabilistic classification models providing different patterns of independence can be employed.

As will be readily appreciated from the subject specification, the innovation can employ classifiers that are explicitly trained (e.g., via a generic training data) as well as implicitly trained (e.g., via observing user behavior, receiving extrinsic information). For example, the parameters on an SVM are estimated via a learning or training phase. Thus, the classifier(s) can be used to automatically learn and perform a number of functions, including but not limited to determining according to a predetermined criteria an instant or future activity of a user or group of users based upon actions taken, context, etc.

Similarly, the state of an activity can be determined (or inferred) at 208. For example, based upon a user action, or set of actions, the state of an activity can be determined. As well, in alternative aspects, the system can employ actions associated to a number of users in order to determine the state of the activity at 208. At 210, the system can determine available devices. In aspects, the available devices can be associated to a user or group of users.

At 212, the task can be delegated to a device or group of devices in accordance with the activity, state within the activity and gathered context information. The novel concepts described with reference to the methodology of FIG. 2 will be better understood upon a review of the figures that follow. While specific examples are described, it is to be understood and appreciated that alternative examples exist that incorporate or utilize the novel functionality described herein. As such, these alternative examples are to be included within the scope of the innovation and claims appended hereto.

Figure 3:
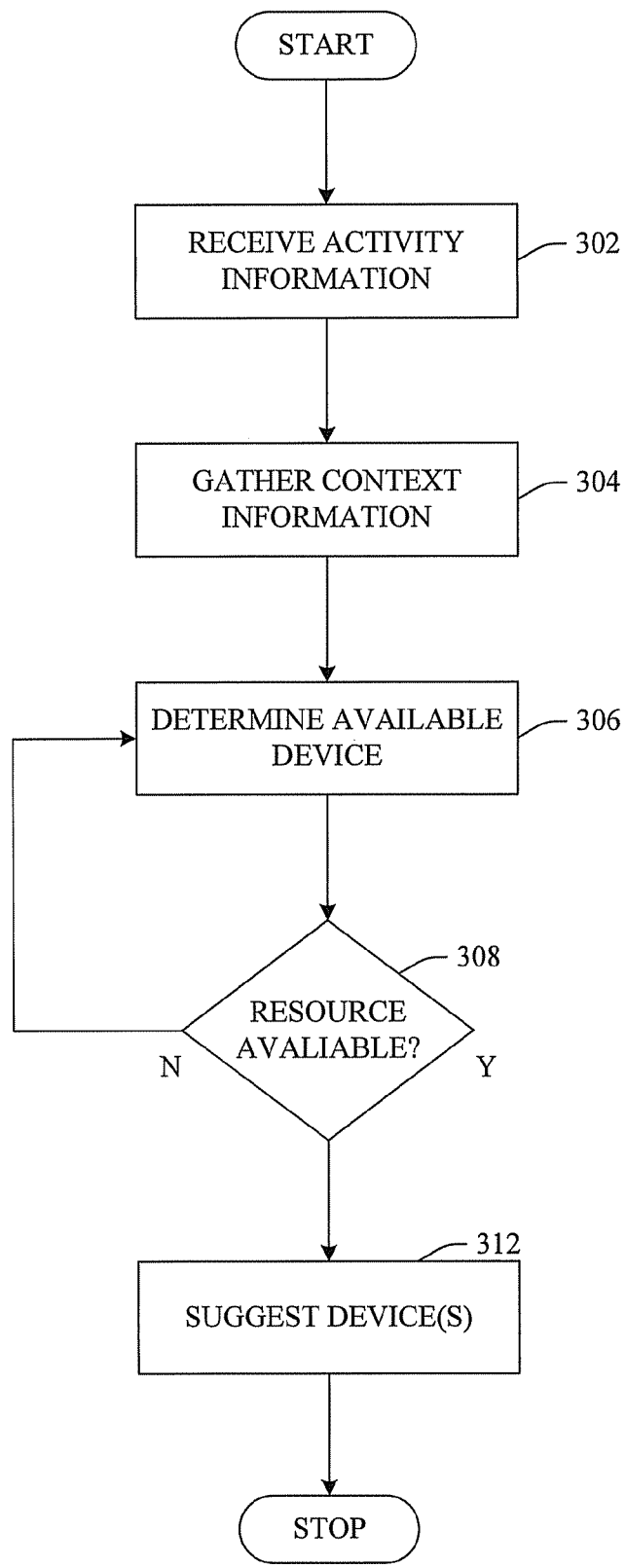
FIG. 3 illustrates an exemplary flow chart of procedures that facilitate suggesting an activity-centric device in accordance with an aspect of the innovation.

Turning now to FIG. 3, there is illustrated an alternative methodology of suggesting a device, or group of devices, in accordance with an aspect of the innovation. Beginning at 302, activity information is received. It is to be understood that the activity information can be directly identified by a user or, in other aspects, inferred from user actions. Context information can be gathered at 304 and available devices determined at 306.

At 308, a determination can be made to identify if necessary resources are available in view of the available devices. For example, if a particular task within the activity requires an image capture device, the system can determine which, if any, of the available devices are equipped with the necessary resource functionality to accomplish a task related to the activity. If the resource is available with a device, a suggestion can be made to utilize the device. If, however, the resource is not available within any of the available devices, the methodology can return to 306 in order to identify other devices that have the necessary resource(s) available.

Figure 4:
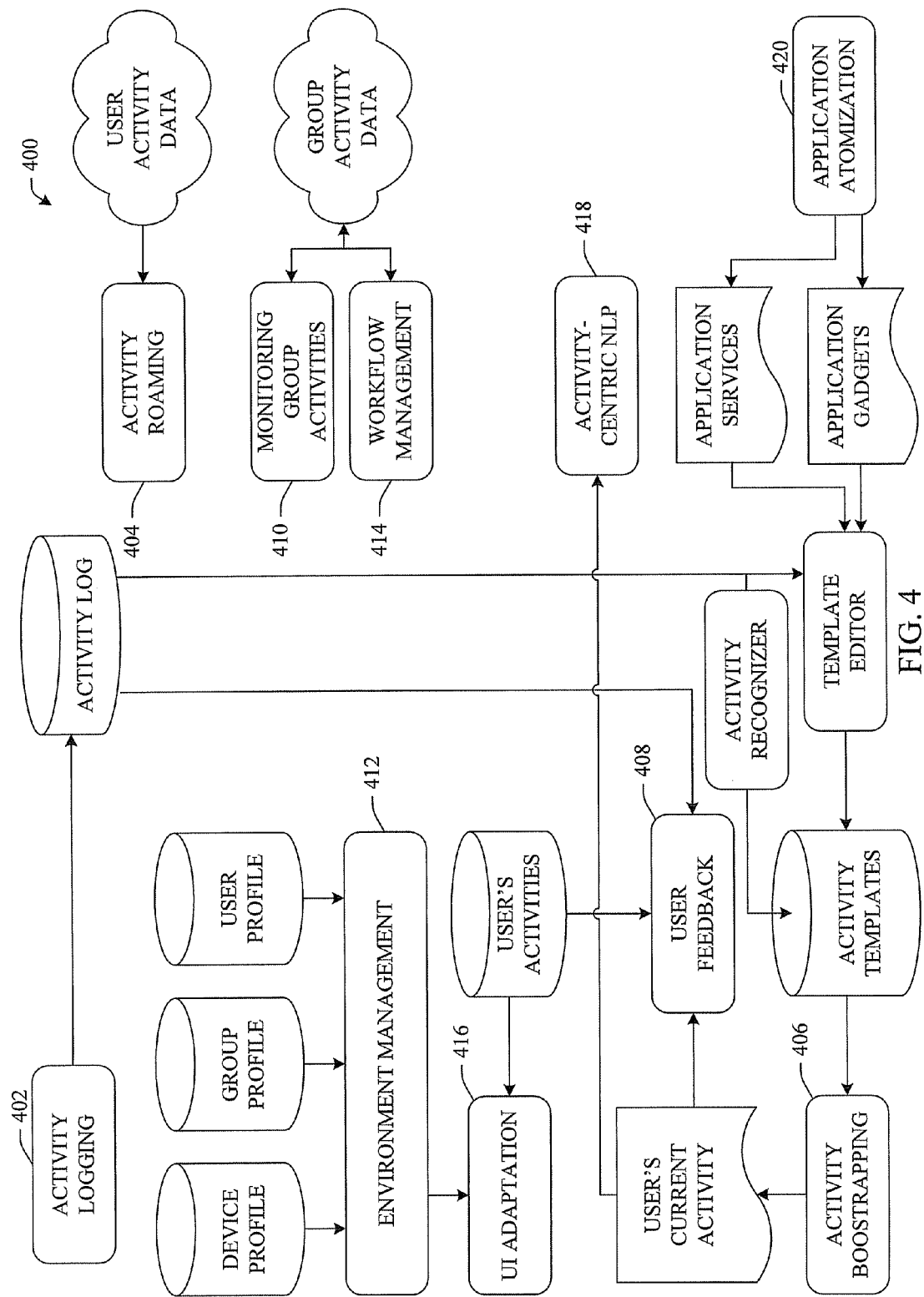
FIG. 4 illustrates an overall activity-centric system in accordance with an aspect of the innovation.

Turning now to FIG. 4, an overall activity-centric system 400 operable to perform novel functionality described herein is shown. As well, it is to be understood that the activity-centric system of FIG. 4 is illustrative of an exemplary system capable of performing the novel functionality of the Related Applications identified supra and incorporated by reference herein. Novel aspects of each of the components of system 400 are described below.

The novel activity-centric system 400 can enable users to define and organize their work, operations and/or actions into units called "activities." Accordingly, the system 400 offers a user experience centered on those activities, rather than pivoted based upon the applications and files of traditional systems. The activity-centric system 400 can also usually include a logging capability, which logs the user's actions for later use.

In accordance with the innovation, an activity typically includes or links to all the resources needed to perform the activity, including tasks, files, applications, web pages, people, email, and appointments. Some of the benefits of the activity-centric system 400 include easier navigation and management of resources within an activity, easier switching between activities, procedure knowledge capture and reuse, improved management of activities and people, and improved coordination among team members and between teams.

As described herein and illustrated in FIG. 4, the system 400 discloses an extended activity-centric system. However, the particular innovation (e.g., enabling activities to cross machines) disclosed herein is part of the larger, extended activity-centric system 400. An overview of this extended system 400 follows.

The "activity logging" component 402 can log the user's actions on a device to a local (or remote) data store. By way of example, these actions can include, but are not limited to include, resources opened, files changed, application actions, etc. As well, the activity logging component 402 can also log current activity and other related information. This data can be transferred to a server that holds the user's aggregated log information from all devices used. The logged data can later be used by the activity system in a variety of ways.

The "activity roaming" component 404 is responsible for storing each of the user's activities, including related resources and the "state" of open applications, on a server and making them available to the device(s) that the user is currently using. As well, the resources can be made available for use on devices that the user will use in the future or has used in the past. The activity roaming component 404 can accept activity data updates from devices and synchronize and/or collaborate them with the server data.

The "activity boot-strapping" component 406 can define the schema of an activity. In other words, the activity boot-strapping component 406 can define the types of items it can contain. As well, the component 406 can define how activity templates can be manually designed and authored. Further, the component 406 can support the automatic generation, and tuning of templates and allow users to start new activities using templates. Moreover, the component 406 is also responsible for template subscriptions, where changes to a template are replicated among all activities using that template.

The "user feedback" component 408 can use information from the activity log to provide the user with feedback on his activity progress. The feedback can be based upon comparing the user's current progress to a variety of sources, including previous performances of this or similar activities (using past activity log data) as well as to "standard" performance data published within related activity templates.

The "monitoring group activities" component 410 can use the log data and user profiles from one or more groups of users for a variety of benefits, including, but not limited to, finding experts in specific knowledge areas or activities, finding users that are having problems completing their activities, identifying activity dependencies and associated problems, and enhanced coordination of work among users through increased peer activity awareness.

The "environment management" component 412 can be responsible for knowing where the user is, the devices that are physically close to the user (and their capabilities), and helping the user select the devices used for the current activity. The component 412 is also responsible for knowing which remote devices might be appropriate to use with the current activity (e.g., for processing needs or printing).

The "workflow management" component 414 can be responsible for management and transfer of work items that involve other users or asynchronous services. The assignment/transfer of work items can be ad-hoc, for example, when a user decides to mail a document to another user for review. Alternatively, the assignment/transfer of work items can be structured, for example, where the transfer of work is governed by a set of pre-authored rules. In addition, the workflow manager 414 can maintain an "activity state" for workflow-capable activities. This state can describe the status of each item in the activity, for example, which it is assigned to, where the latest version of the item is, etc.

The "UI adaptation" component 416 can support changing the "shape" of the user's desktop and applications according to the current activity, the available devices, and the user's skills, knowledge, preferences, policies, and various other factors. The contents and appearance of the user's desktop, for example, the applications, resources, windows, and gadgets that are shown, can be controlled by associated information within the current activity. Additionally, applications can query the current activity, the current "step" within the activity, and other user and environment factors, to change their shape and expose or hide specific controls, editors, menus, and other interface elements that comprise the application's user experience.

The "activity-centric recognition" component or "activity-centric natural language processing (NLP) component" 418 can expose information about the current activity, as well as user profile and environment information in order to supply context in a standardized format that can help improve the recognition performance of various technologies, including speech recognition, natural language recognition, desktop search, and web search.

Finally, the "application atomization" component 420 represents tools and runtime to support the designing of new applications that consist of services and gadgets. This enables more fine-grained UI adaptation, in terms of template-defined desktops, as well as adapting applications. The services and gadgets designed by these tools can include optional rich behaviors, which allow them to be accessed by users on thin clients, but deliver richer experiences for users on devices with additional capabilities.

In accordance with the activity-centric environment 400, once the computer understands the activity, it can adapt to that activity. For example, if the activity is the review of a multi-media presentation, the application can display the information differently as opposed to an activity of the UI employed in creating a multi-media presentation. All in all, the computer can react and tailor functionality and the UI characteristics based upon a current state and/or activity. The system 400 can understand how to bundle up the work based upon a particular activity. Additionally, the system 400 can monitor actions and automatically bundle them up into an appropriate activity or group of activities. The computer will also be able to associate a particular user to a particular activity, thereby further personalizing the user experience.

In summary, the activity-centric concept of the subject system 400 is based upon the notion that users can leverage a computer to complete some real world activity. As described supra, historically, a user would outline and prioritize the steps or actions necessary to complete a particular activity mentally before starting to work on that activity on the computer. In other words, conventional systems do not provide for systems that enable the identification and decomposition of actions necessary to complete an activity.

The novel activity-centric systems enable automating knowledge capture and leveraging the knowledge with respect to previously completed activities. In other words, in one aspect, once an activity is completed, the subject innovation can infer and remember what steps were necessary when completing the activity. Thus, when a similar or related activity is commenced, the activity-centric system can leverage this knowledge by automating some or all of the steps necessary to complete the activity. Similarly, the system could identify the individuals related to an activity, steps necessary to complete an activity, documents necessary to complete, etc. Thus, a context can be established that can help to complete the activity next time it is necessary to complete. As well, the knowledge of the activity that has been captured can be shared with other users that require that knowledge to complete the same or a similar activity.

Historically, the computer has used the desktop metaphor, where there was effectively only one desktop. Moreover, conventional systems stored documents in a filing cabinet where, there was only one filing cabinet. As the complexity of activities rises, and as the similarity of the activities diverges, it can be useful to have many desktops available that can utilize identification of these similarities in order to streamline activities. Each individual desktop can be designed to achieve a particular activity. It is a novel feature of the innovation to build this activity-centric infrastructure into the operating system such that every activity developer and user can benefit from the overall infrastructure.

The activity-centric system proposed herein is made up of a number of components as illustrated in FIG. 4. It is the combination and interaction of these components that compromises an activity-centric computing environment and facilitates the specific novel functionality described herein. At the lowest level the following components make up the core infrastructure that is needed to support the activity-centric computing environment; Logging application/user actions within the context of activities, User profiles and activity-centric environments, Activity-centric adaptive user interfaces, Resource availability for user activities across multiple devices and Granular applications/web-services functionality factoring around user activities. Leveraging these core capabilities with a number of higher-level functions are possible, including; providing user information to introspection, creating and managing workflow around user activities, capturing ad-hoc and authored process and technique knowledge for user activities, improving natural language and speech processing by activity scoping, and monitoring group activity.

Figure 5:
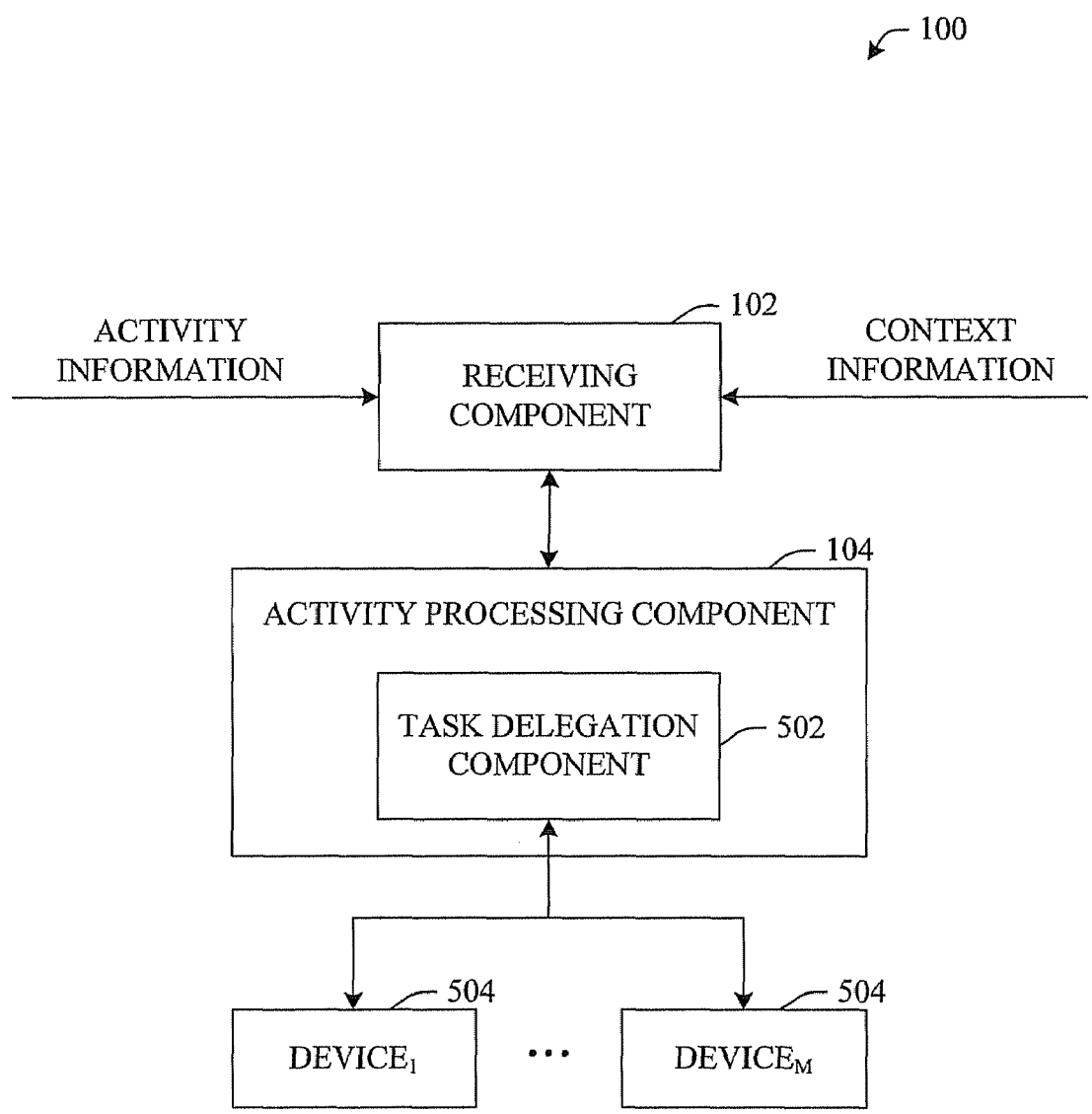
FIG. 5 illustrates a system that includes a task delegation component in accordance with an aspect of the innovation.

Turning now to FIG. 5, an alternative architectural diagram of activity-centric enabled system 100 in accordance with an aspect of the innovation is shown. As illustrated, system 100 can include a receiving component 102 and an activity processing component 104. The activity processing component 104 can incorporate a task delegation component 502 that selectively delegates an activity task to at least one of devices 1 to M, where M is an integer. It is to be understood that 1 to M devices can be referred to collectively or individually as device 504. It is also to be understood that the device(s) 504 can be representative of any wired or wireless mobile device (e.g., personal data assistant (PDA), cellular phone, smartphone, pocket computer, etc.), a personal computer, a laptop, etc.

Effectively, the innovation discloses an activity-centric system 100 that can facilitate moving activities across machines. More particularly, the system 100 addresses a scenario of roaming between devices 504 with respect to an activity as well as working on an activity that involves multiple devices 504.

Accordingly, the steps or tasks within an activity, as well as the resources necessary to complete the steps within the activity, are understood by the activity processing component 104. To this end, the receiving component 102 of the system 100 can monitor user actions in order to determine a state of an activity and subsequently to determine a set of resources necessary to complete a task. In one aspect, the system 100 can employ ad hoc activities which refer to an activity where knowledge about the activity is learned as the user is working. Similarly, other aspects are directed to structured activities where the steps are pre-defined. As well, still other aspects can include a combination of each (ad hoc and structured activities). There can also be policies, profiles and preferences which can be employed with this innovation thus providing for a very rich activity-centric computing environment.

In operation, a user can subscribe devices whereby the devices can disclose their capabilities. These capabilities (e.g., context factors) can contribute to the system's decision making ability with respect to the activity-centric design. As well, the activity processing component 104 can interrogate each of the devices 504 in order to determine specific capabilities and resources associated with each.

As described above, user and environment context factors can be combined with activity information (e.g., activity context factors) and device profile information in order to efficiently make decisions. This scenario can be described as mixed initiated roaming. In other words, the activity processing component 104 can employ the task delegation component 502 to identify suitable devices 504 with respect to particular activity tasks or states within the activity. It is to be understood and appreciated that, in examples, the roaming can be user initiated or activity-context initiated.

There are at least two novel aspects where activities can be affected by the use of multiple devices or machines 504. The first is an "asynchronous" scenario. In an asynchronous scenario, a single or multiple devices 504 can be used at different times in different contexts to accomplish a task. In other words, the activity can be thought of as "roaming" from one device to another. This scenario can be directed to a single user or multiple users and the "roaming" can be effectuated via the task delegation component 502. Another aspect is directed to a "synchronous" scenario. In a synchronous scenario, an activity can be accomplished by a single user, or multiple concurrent users, employing multiple devices 504 simultaneously. Each of the "asynchronous" and "synchronous" examples is described in more detail below.

Figure 6:
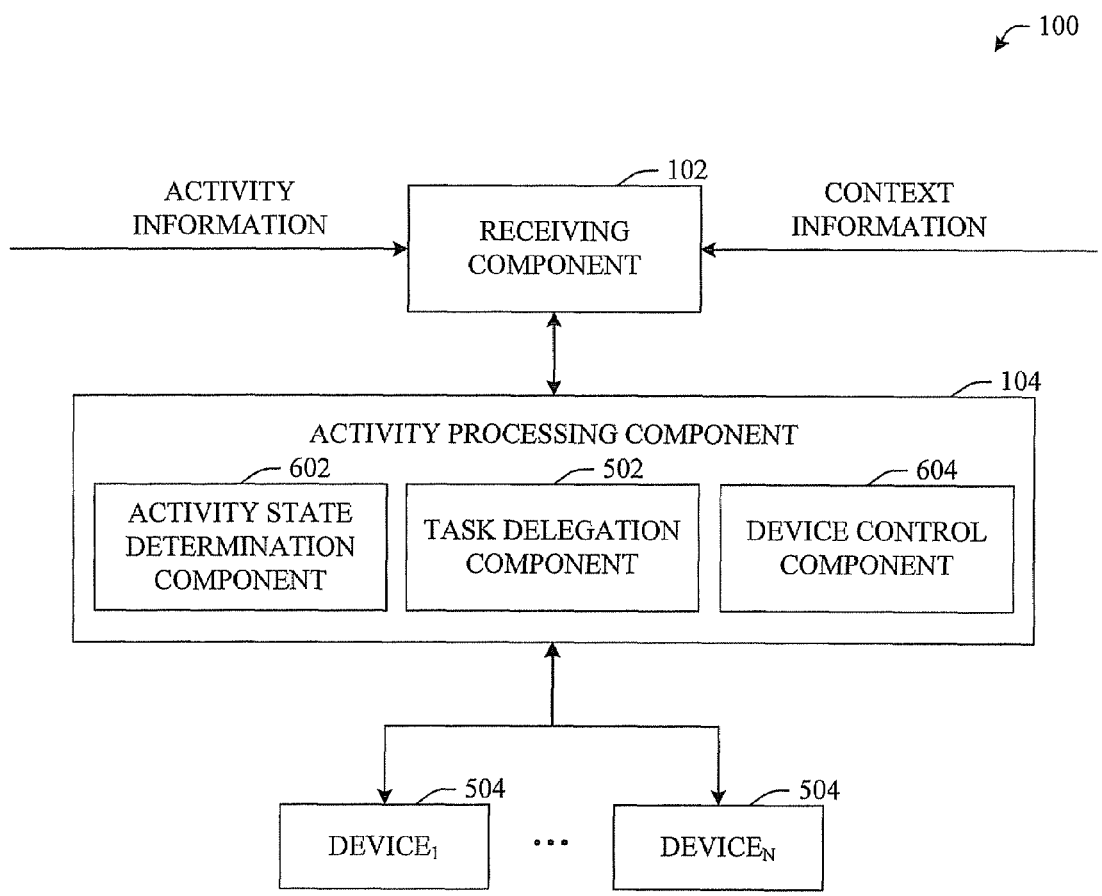
FIG. 6 illustrates a system that includes an activity state determination component and a device control component in accordance with an aspect of the innovation.

With reference now to FIG. 6, an alternative architectural diagram of a system 100 in accordance with an aspect of the innovation is shown. More specifically, the aspect illustrated in FIG. 6 includes an activity processing component 104 having a task delegation component 502, an activity state determination component 602 and a device control component 604. Each of these components (502, 602, 604) enable the activity processing component 104 to delegate tasks to devices and/or triage devices in either an asynchronous and/or synchronous environment.

In an activity roaming scenario (e.g., asynchronous), it is to be understood that this innovation can employ any physical medium or location in which activities and components reside. In other words, for the purposes of this innovation, it is inconsequential whether the activity data exists locally on the device currently being used or remotely on a different device. In fact, the innovation can equally support both scenarios. As well, the innovation can support a scenario where some of the activity information is housed locally and where other such activity information is located remotely.

Accordingly, from a user perspective, it is not necessary for the user to know where the activity data resides. If the activity data and associated resources exist remotely, they can become available when the user logs onto a network enabled device. Similarly, when the user works on that device in the future, even if not network-connected, the activity can still be made available to them. This subsequent availability can be effectuated via the dynamic activity synchronization of the innovation.

With reference to FIG. 6, an activity state determination component 602 can be employed to analyze user actions and other context information thereafter determining a state and/or progress within a particular activity. Once the state is determined, the task delegation component 502 can interface with the device control component 604 to determine an appropriate device in view of the activity, state within the activity and gathered context information.

In one roaming example, a user can employ the device control component 604 to move an activity from one device 504 to another device 504 in a manual way. For example, the user can employ the task delegation component 502 to manually select the activity and data they would like to move thereby manually invoking roaming. It will be appreciated that the user can either transfer the activity and related data wirelessly over a network, or download the activity (or portion thereof) via a CD, USB device or the like in order to move the activity from a network-connected device 504 to a non-network enabled device 504.

In all, activities can be thought to exist on some medium and when connected to an activity-enabled system, all or some subset of the activity can be downloaded and/or made available as needed. The preceding discussion can be thought to be viewed from an activity-centric view of roaming. It is to be understood that another way to view this scenario is from the user-centric point of view. In other words, as a user moves from one device 504 to another, the activities and services associated with the activities can automatically move with the user.

In a particular scenario, suppose a user begins preparing for a meeting at home on a laptop, modifies the preparation on a personal data assistant (PDA) in route to the office and continues on a desktop computer working on the activity when in the office. The innovation can be particularly useful in automatically keeping all machines up-to-date and/or synchronized with respect to the state of the particular activity based upon a particular user. In all, the activity processing component 104 can facilitate automatically determining the activity state (e.g., via activity state determination component 602), dynamically delegating activity tasks to a device or group of devices (e.g., via task delegation component 502), and automatically synchronizing the activity information to the device or group of devices (e.g., via the device control component 604).

Figure 7:
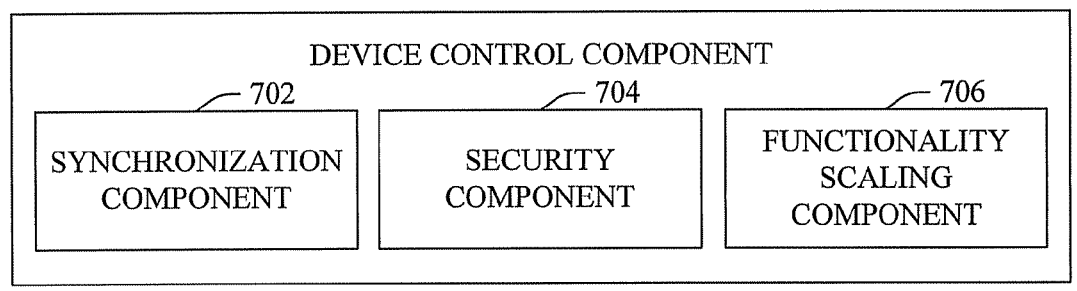
FIG. 7 illustrates a device control component having a synchronization component, a security component, and a functionality scaling component in accordance with an aspect of the innovation.

FIG. 7 illustrates an exemplary device control component 604 in accordance with an aspect of the innovation. Generally, the device control component 604 can include a synchronization component 702, a security component 704 and a functionality scaling component 706.

In operation, the synchronization component 702 can synchronize the activity and related data accomplished on a device 504 with disparate devices 504. The security component 704 can employ security policies with respect to availability of activities and data associated therewith. By way of example, the security component 704 can look to a user's role within an activity thus, limiting access to activities and data associated therewith to only those having appropriate authority to participate in the activity.

In all, the security component 704 can restrict or allow access to information based upon activity and user context (e.g., state, role, characteristics). For example, if the user is in a meeting with respect to a particular activity, the innovation can determine who is present and can selectively mask information based upon security levels or roles. The innovation can also determine what information is appropriate to display publicly, as well as an optimum mode to display the information.

The functionality scaling component 706 can determine an appropriate level of detail and application functionality to expose to the user. For example, in the above meeting preparation scenario, the user might only need to review notes on the PDA in route to the office and might not need the editing features associated with the application when performing the task. To this end, the functionality scaling component 706 can facilitate appropriately exposing only the information and functionality required based upon knowledge of the activity and the step or task of the activity.

Turning now to a discussion of the synchronous scenario, as described above, this scenario looks at the situation where a user is employing multiple devices simultaneously to work on a particular activity. By way of example, in working on an activity, a user can be working on a desktop PC while talking on a cellular phone. Alternatively, in another example, a user can be working on a laptop and a PDA and talking on a cellular phone simultaneously. Effectively, in accordance with the novel functionality of the device control component 604, the devices can share knowledge of and with each other thus, enabling the synchronous activity scenario.

Referring again to FIG. 6, by way of further example, when a call is received on a cell phone, the activity processing component 104 can enable the phone to be aware that the user is working on a laptop with respect to a particular activity. As such, the phone can enable the call to go directly to voice mail if the user is at a critical place within the activity and therefore unavailable. This location can be determined via the environment context information. Alternatively, the phone can route the call to the laptop for delivery so that the user need not switch devices. All in all, the system 100 can understand the state of an activity with respect to a particular user context. In a disparate aspect, the system can look at a user's calendar thereby determining that the user is in a meeting. As well, other contextual sensors (e.g., environment sensors) can be provided that enable a dynamic activity-centric scenario.

Figure 8:
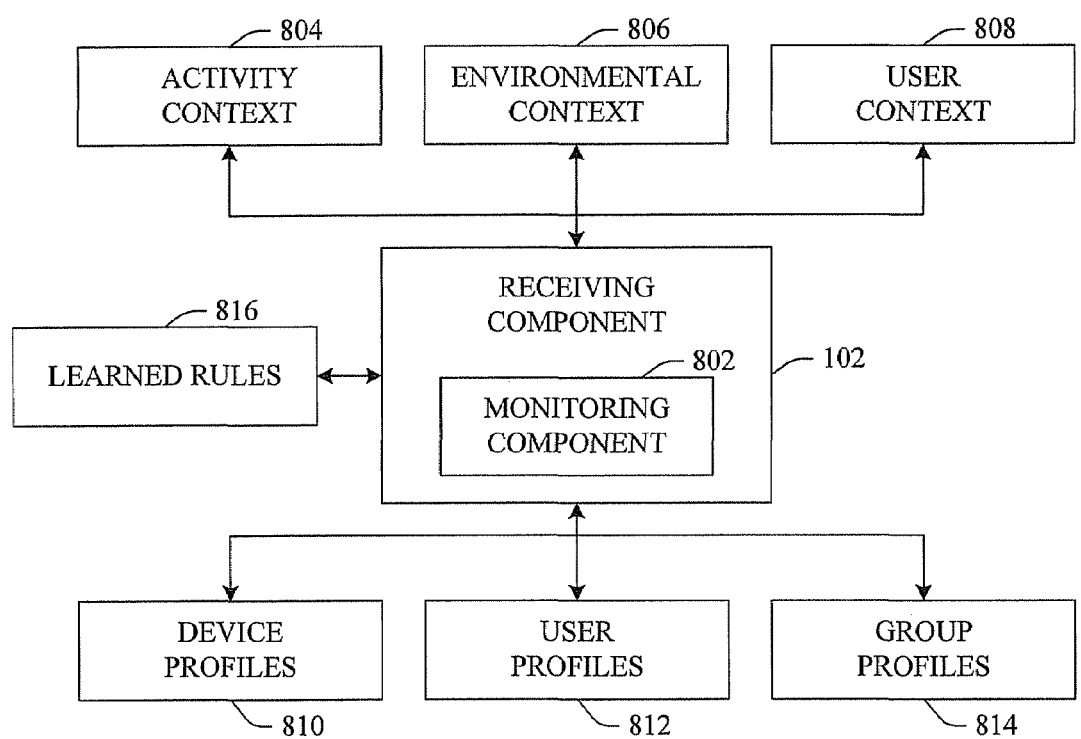
FIG. 8 illustrates a receiving component having a monitoring component in accordance with an aspect of the innovation.

FIG. 8 illustrates a block diagram of a receiving component 102 having a monitoring component 802 therein. More particularly, the monitoring component 802 can facilitate automatically gathering context data, including but not limited to, activity context 804, environment context 806, user context 808, device profiles 810, user profiles 812, group profiles 814, learned rules 816, or the like. In operation, this information can be employed to manage activities with respect to devices.

Figure 9:
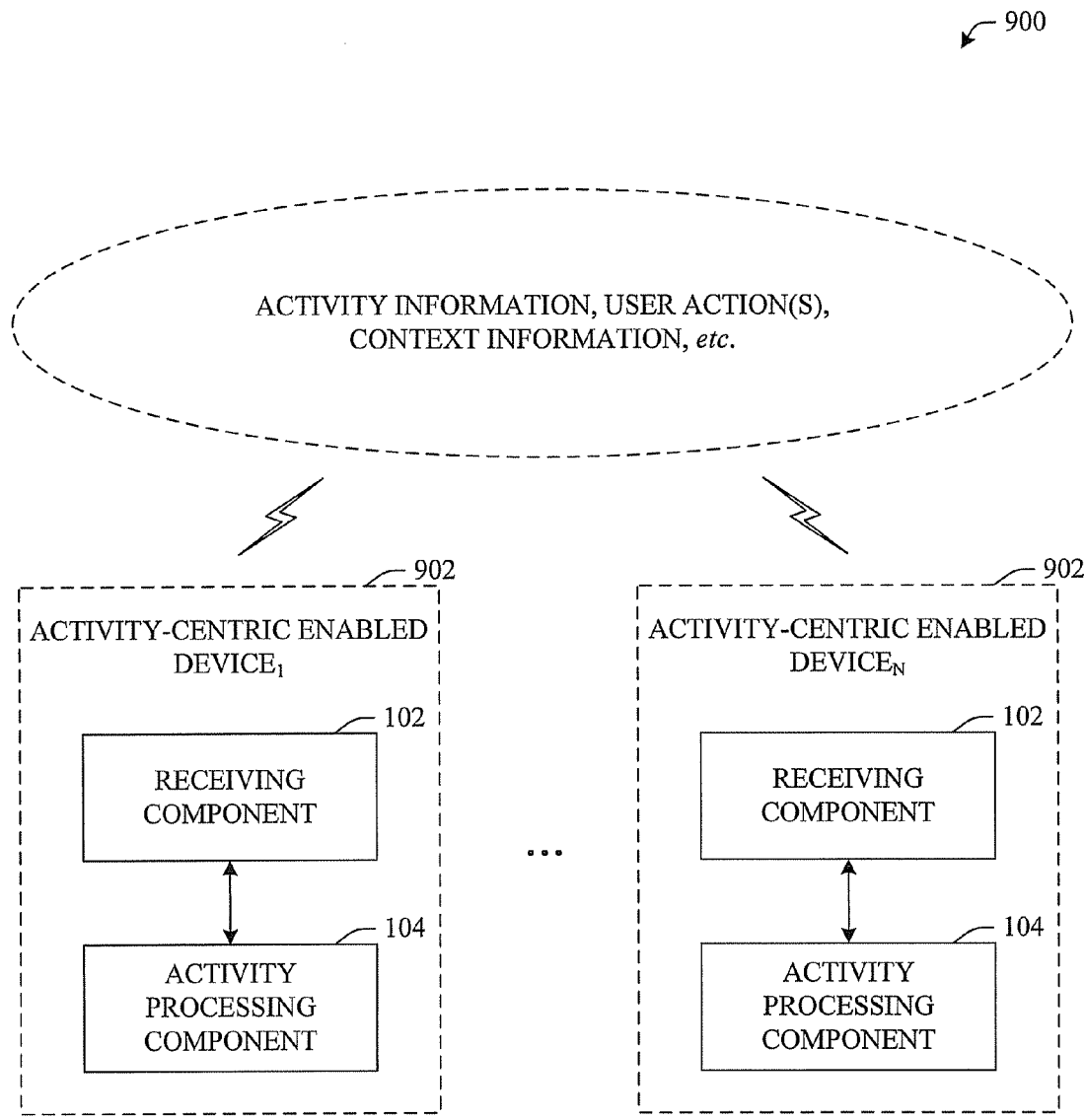
FIG. 9 illustrates a system having multiple devices capable of processing activity information in accordance with an aspect of the innovation.

FIG. 9 illustrates an alternative system 900 that facilitates employing multiple devices with respect to an activity or group of activities in accordance with an aspect of the innovation. Generally, system 900 can include 1 to N activity-centric enabled devices, where N is an integer. As shown, each of the activity-centric enabled devices 902 can include a receiving component 102 and an activity processing component 104. In operation, the receiving component 102 of each device can access activity information, user action(s), context information, etc. and transfer the information to an activity processing component 104. The activity processing component 104 can determine which devices 902 to employ (e.g., activate) with respect to an action. Similarly, the activity processing component 104 can automatically synchronize information related to an activity into each appropriate and/or capable device 902.

In either an asynchronous or a synchronous scenario, in one aspect, it will be understood that the devices 902 are capable of connectivity between the disparate devices 902. With respect to data storage, a single device 902 can be labeled as a "primary" or "master" device. For example, suppose a user is working on a desktop computer, a laptop and a cell phone with respect to a single activity, the data can reside in a single device 902. Thus, appropriate UI's can be directed to the other devices 902 in order to facilitate the activity.

However, in another aspect, the data need not exist on a single device 902 and could be distributed across multiple devices 902, potentially even owned and controlled by multiple people. In such a scenario, the system can additionally establish secure data exchange as well as coordinate where to pull data from and push output to in view of an activity. This security can be established via a security component 704 as described with reference to FIG. 7. It is to be understood that any authentication and/or authorization techniques can be employed in aspects of the innovation without departing from the spirit and/or scope of the innovation and claims appended hereto.

In yet another aspect, a user can employ one machine (e.g., device 902) to access information via a network (e.g., Internet, intranet) while entering information into another machine (e.g., device 902). As such, it is to be understood that it is not a requirement that the two machines be resident within the same network in order to be employed with respect to a particular activity.

It is to be understood that the subject innovation can be viewed as a system 900, as a whole behaving characteristically as a single device. For example, suppose a user is working on a desktop computer and the phone rings from another member of the activity team. The system can automatically analyze (e.g., via activity processing component 902) the identity of the caller thereby making available all information with regard to the caller's role or even a list of emails from the caller.

In still another scenario that leverages capabilities with respect to multiple devices 902 to create a seamless computing environment, in accordance with this scenario, suppose a user enters a room with respect to a particular activity. As such, the devices 902 can collaborate and be automatically configured for that particular activity. For example, a phone can be set to only receive calls from participants or individuals related to the activity. Email can be filtered to only include activity-based email. Similarly, a laptop can be set to display certain of its content to a large public display (based upon activity scope, roles, security issues, etc.). Moreover, the layout of the information related to the activity could be contextually appropriate and prepared. As described supra, this information can be triggered based upon sensors which can be employed to monitor and/or determine action with respect to a particular activity. Essentially, the resources available can be filtered and/or controlled around activities. As well, the system can automatically choose which UI aspects to display, and how, in accordance with the activity, device context, and user context.

With reference again to FIG. 9 and turning to a discussion of suggesting an appropriate device 902, in some aspects there may be an appropriate device 902 with respect to an activity or state within the activity. As such, the system can proactively surface (e.g., make available) information with respect to the activity. In operation, the devices can collaborate to determine an appropriate and/or capable set of devices. On the other hand, if an appropriate device 902 is not available, the system can automatically adjust in alternate ways to take a disparate action as a part of the activity or to delay until the user is in an environment where there is an appropriate device 902.

In a particular example, suppose a user has a conventional desktop computer and a tablet computer. In operation, the system 900 can automatically determine which device 902 to use when the tablet's graphical capabilities are required with respect to a task within an activity. For instance, when a document is to be signed, the system 900 can automatically shift focus to the tablet thereby making the pen-input capability available.

In another aspect, the system can recommend activity tasks that can be completed based upon user and/or device context and availability. In an example, it can be determined from an analysis of a user's calendar a two hour time slot is available for work on an activity. Thus, the system can automatically suggest a task that can be completed in the two hours. Similarly, the device can proactively decide between available tasks based upon capabilities and resources available.

Figure 10:
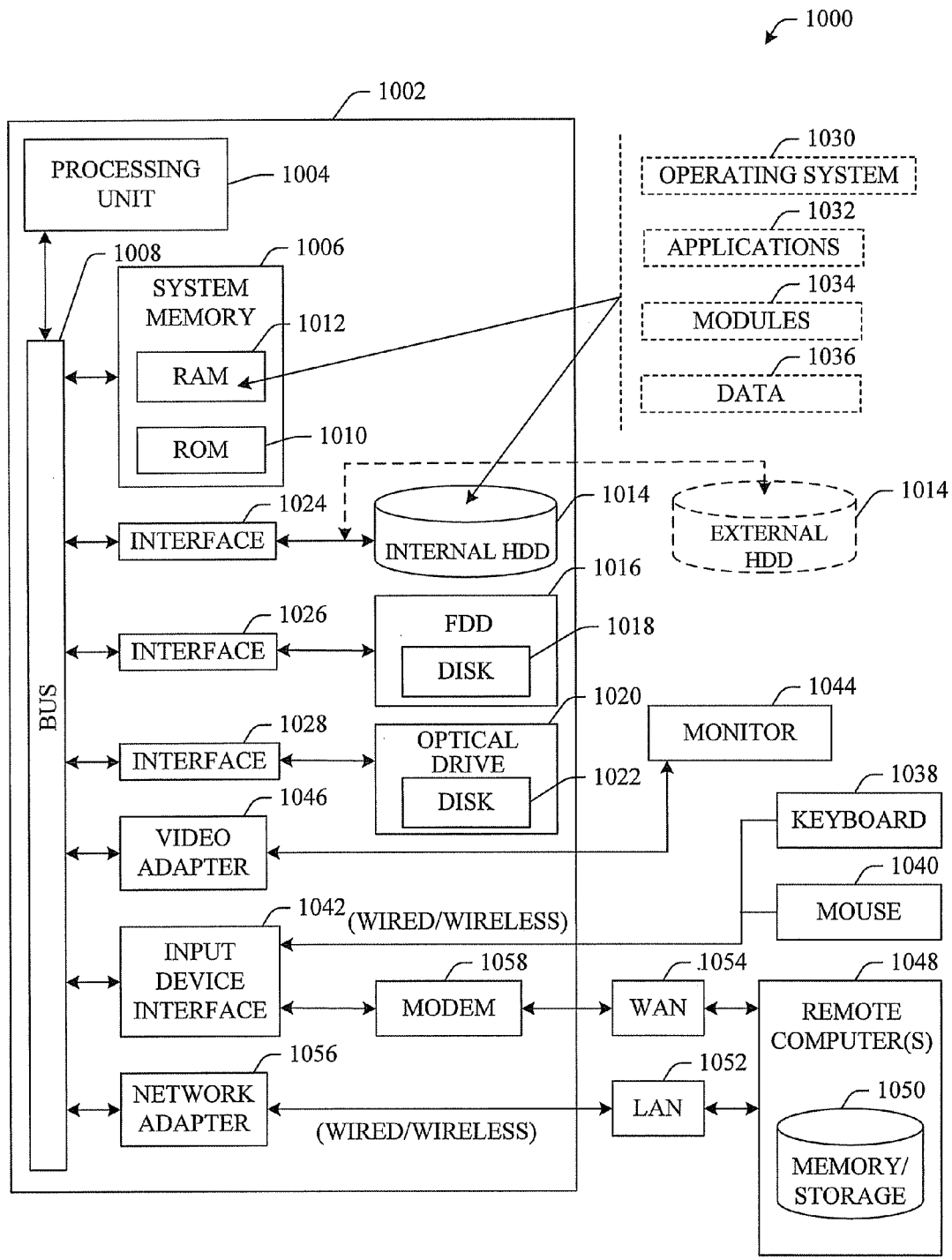
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
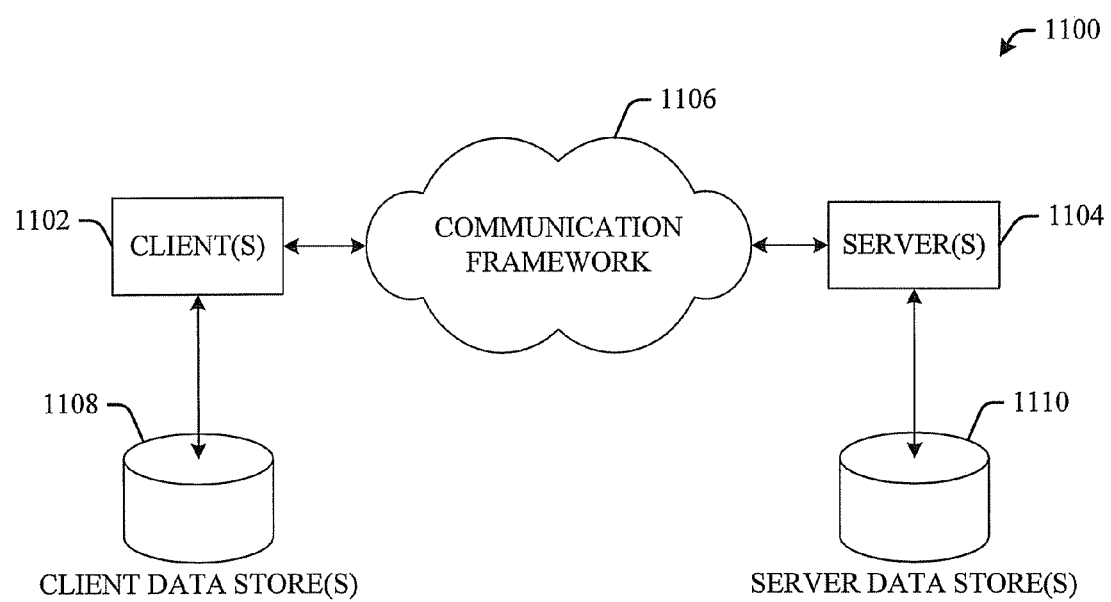
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates activity-centric computing, comprising:
    at least one processor that executes the following computer executable components stored on at least one computer readable medium;
    a receiving component that accepts activity information established based on activity performed by a user on a first device;
    an activity roaming component that stores the activity information, the activity information including at least one of an associated resource or a state, the activity roaming component making the activity information available to at least one activity-enabled target device different from the first device; and
    an activity processing component that determines a task of an activity based upon the activity information and delegates the task to the at least one activity-enabled target device different from the first device, to continue, by the user or another user on the target device, the activity performed on the first device.

2. The system of claim 1, the activity processing component includes a task delegation component that assigns the task to a plurality of activity-enabled devices.

3. The system of claim 2, the activity processing component further comprises an activity state determination component that establishes a state of the activity, the activity processing component employs the state to assign the task to the plurality of activity-enabled devices.

4. The system of claim 2, the activity processing component further comprises a device control component that selects the at least one activity-enabled target device from a plurality of available devices.

5. The system of claim 4, the device control component further comprises a synchronization component that synchronizes the activity information between a subset of the plurality of available devices.

6. The system of claim 4, the device control component further comprises a security component that manages access to data related to the activity based at least in part upon one of a user role, a security policy and data confidentiality.

7. The system of claim 4, the device control component further comprises a functionality scaling component that at least one of limits and expands functionality of an application related to the activity with respect to the at least one activity-enabled target device.

8. The system of claim 2, the receiving component further gathers context information; the activity processing component employs the context information to delegate the task to the at least one activity-enabled target device.

9. The system of claim 8, the context information is at least one of an activity context, an environment context, a user context, a device profile, a user profile and a group profile.

10. The system of claim 2, the task delegation component employs a learned model to delegate the task to the at least one activity-enabled target device.

11. The system of claim 10, the learned model is established via a machine learning and reasoning (MLR) mechanism.

12. The system of claim 11, the MLR mechanism employs at least one of supervised, unsupervised or semi-supervised methods to acquire the learned model.

13. A computer-implemented method of accomplishing an activity via a plurality of devices, comprising:
   employing a processor to execute computer readable instructions stored on a computer readable medium to perform the following acts:
   receiving activity information corresponding to a set of actions taken by a user on a first device;
   determining a state of the activity based at least in part upon the activity information, the state identifies a plurality of tasks related to the activity;
   aggregating at least one of state information or resource information associated with the activity information on an intermediate device;
   determining a plurality of activity-enabled devices based on at least in part on the state of the activity;
   identifying a subset of the plurality of tasks based at least in part on device availability;
   delegating the subset of the plurality of tasks to a subset of the plurality of activity-enabled devices;
   via the intermediate device, making aggregated information available to the subset of the plurality of activity-enabled devices; and
   synchronizing the delegated tasks with the set of actions taken by the user on the first device, for continuing, by the user or another user, the activity on the subset of the plurality of activity-enabled devices.

14. The method of claim 13, further comprising gathering context data, the act of delegating a subset of the plurality of tasks employs the context data to determine the subset of the plurality of activity-enabled devices.

15. The method of claim 14, the context data is at least one of an activity context, an environment context, a user context, a device profile, a user profile and a group profile.

16. The method of claim 13, further comprising suggesting at least one of the plurality of activity-enabled devices based at least in part upon a device profile.

17. A system that facilitates collaboration among a plurality of activity-enabled devices, comprising:
   at least one processor that executes the following computer executable components stored on at least one computer readable medium:
   means for determining a state of an activity corresponding to a set of actions taken by a user on a first device;
   means for aggregating activity information including the state of the activity on a second device; and
   means for automatically transferring aggregated activity information to an activity-enabled target device different from the first device and the second device, for continuing the activity by the user or another user on the target device, based at least in part upon the aggregated activity information.

18. The system of claim 17, further comprising means for synchronizing data associated with the activity onto a subset of the plurality of activity-enabled devices.

19. The system of claim 18, further comprising means for suggesting the activity-enabled device based at least in part upon a device profile.

20. A method of supporting a computer-assisted activity, comprising:
   employing a processor to execute computer readable instructions stored on a computer readable medium to perform the following acts:
   receiving activity information corresponding to a set of user actions associated with a computer-assisted activity by a user on a first computing device;
   logging the activity information to a data store;
   transferring the logged activity information to a server for aggregating user log information; and
   via the server, making resources associated with the logged activity information available to a second computing device, for continuing the computer-assisted activity by the user or another user using the second computing device.

* * * * *